United States Patent
Choi et al.

(10) Patent No.: US 9,008,659 B1
(45) Date of Patent: Apr. 14, 2015

(54) CELL RESELECTION METHODS BASED ON TRACKING AREA FOR CELLULAR SYSTEMS

(75) Inventors: Jihwan P. Choi, San Jose, CA (US);
Jiwon S. Han, San Ramon, CA (US);
Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 392 days.

(21) Appl. No.: 13/407,226

(22) Filed: Feb. 28, 2012

Related U.S. Application Data

(60) Provisional application No. 61/451,404, filed on Mar. 10, 2011.

(51) Int. Cl.
*H04W 36/00* (2009.01)
*H04W 4/00* (2009.01)
*H04W 36/04* (2009.01)

(52) U.S. Cl.
CPC ............................ *H04W 36/04* (2013.01)

(58) Field of Classification Search
CPC ..... H04W 36/36; H04W 36/14; H04W 36/16; H04W 36/24
USPC .......... 455/436, 437, 435.2; 370/331
See application file for complete search history.

(56) References Cited

U.S. PATENT DOCUMENTS

2010/0317349 A1* 12/2010 Serravalle ............... 455/440
2014/0045495 A1* 2/2014 Deshpande et al. ......... 455/434

OTHER PUBLICATIONS

3GPP TS 36.304 V9.5.0 "3rd Generation Partnership Project; Technical Specification Group Radio Access Network; Evolved Universal Terrestrial Radio Access (E-UTRA); User Equipment (UE) procedures in idle mode (Release 9)", Dec. 2010, 32 pages.
3GPP TS 23.122 V9.5.0 "3rd Generation Partnership Project; Technical Specification Group Core Network and Terminals; Non-Access-Stratum (NAS) functions related to Mobile Station (MS) in idle mode (Release 9)", Dec. 2010, 42 pages.
3GPP TS 24.301 V9.5.0 "3rd Generation Partnership Project; Technical Specification Group Core Network and Terminals; Non-Access-Stratum (NAS) protocol for Evolved Packet System (EPS); Stage 3 (Release 9)", Dec. 2010, 297 pages.

* cited by examiner

*Primary Examiner* — Omoniyi Obayanju

(57) ABSTRACT

In a method of assigning cell reselection parameters to be utilized by user devices served by a first cell associated with a first tracking area, that a first signal frequency is associated with a second tracking area different than the first tracking area is determined. Based on a determination that the first signal frequency is associated with the second tracking area different than the first tracking area, a first set of one or more reselection parameters is assigned to the first signal frequency.

6 Claims, 12 Drawing Sheets

*PRIOR ART*

*PRIOR ART*

*PRIOR ART*

CELL RESELECTION METHODS BASED ON TRACKING AREA FOR CELLULAR SYSTEMS

CROSS-REFERENCE TO RELATED APPLICATION

This disclosure claims the benefit of U.S. Provisional Patent Application No. 61/451,404, filed on Mar. 10, 2011, the disclosure of which is hereby incorporated by reference herein in its entirety.

FIELD OF TECHNOLOGY

The present disclosure relates generally to wireless networks and, more particularly, to methods and systems for cell reselection in wireless networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In cellular networks, mobile user devices (e.g., cellular telephones) typically perform an initial "cell selection" process to identify and select a cell having a base station that is capable of adequately serving the user device. Because user devices typically move from area to area, however, the base stations of different cells may become better positioned to communicate with the user devices at different times. Thus, in order to retain a high quality of service, cellular networks typically provide a mechanism for switching which cell serves a user device. When a user device is in active communication with a base station of a serving cell, the process of switching cells is typically referred to as "cell handover". When a user device is in an idle mode (e.g., in a mode in which only overhead data such as paging messages, broadcast parameters, etc., is received from a base station of a serving cell), however, the process is typically referred to as "cell reselection". While cell handover is generally instructed by the network, cell reselection is generally determined by the user device.

In some cellular networks, such as cellular networks arranged according to the $3^{rd}$ Generation Partnership Project Long Term Evolution (3GPP LTE) Specification, various cells are grouped into logical units known as "tracking areas". Under the 3GPP LTE Specification, for example, a user device in idle mode will be sent the same type of paging messages (e.g., paging messages of the same format, and/or paging messages sent at the same interval) so long as the user device remains within a single tracking area. Paging messages are used to notify a user device of emergency information or the arrival of other data intended for the user device, in which case the user device initiates an active communication link with the base station of the cell currently serving the user device. In order to ensure that such paging messages are not lost, a user device in idle mode typically transmits a tracking area update when the user device selects a cell in a new tracking area.

In some systems, a user device can somewhat rapidly change or "ping pong" between cells associated with different tracking areas. For example, a user device in idle mode that follows a meandering path might ping pong between cells of different tracking areas. Even a user device following a relatively straight path near a border of cells in different tracking areas might ping pong between the neighboring cells, e.g. as a result of differing propagation characteristics of communication channels used in the cells. Where the propagation characteristics of the communication channels vary over time, even stationary user devices may be subject to the ping pong effect. Moreover, because each change from one tracking area to another tracking area is generally accompanied by the transmission of a tracking area update from the user device, such scenarios can lead to a heavy signaling load, and increase the risk of losing messages (e.g., paging messages) intended for the user device.

SUMMARY

In one embodiment, a method of assigning cell reselection parameters to be utilized by user devices served by a first cell associated with a first tracking area includes determining that a first signal frequency is associated with a second tracking area different than the first tracking area. The method also includes, based on a determination that the first signal frequency is associated with the second tracking area different than the first tracking area, assigning a first set of one or more reselection parameters to the first signal frequency.

In another embodiment, an apparatus includes a network controller configured to determine that a signal frequency is associated with a second tracking area different than a first tracking area. The network controller is also configured to, based on a determination that the signal frequency is associated with the second tracking area different than the first tracking area, assign a set of one or more reselection parameters to the signal frequency.

In yet another embodiment, a method of assigning cell reselection parameters to be utilized by user devices served by a first cell includes comparing a first tracking area associated with the first cell to a second tracking area associated with a second cell. The method also includes, based on a comparison of the first tracking area to the second tracking area, assigning a first set of one or more reselection parameters to the second cell.

In still another embodiment, an apparatus includes a network controller configured to compare a first tracking area associated with a first cell to a second tracking area associated with a second cell. The network controller is also configured to, based on a comparison of the first tracking area to the second tracking area, assign a set of one or more reselection parameters to the second cell.

In still another embodiment, a method for performing cell reselection in a user device served by a first cell includes receiving a first set of one or more reselection parameters. The first set of one or more reselection parameters includes a tracking area identifier associated with a second cell. The second cell neighbors the first cell. The method also includes comparing the tracking area identifier associated with the second cell to a tracking area identifier associated with the first cell. The method further includes determining a second set of one or more reselection parameters associated with the second cell. The method yet further includes determining whether to reselect the second cell based on (i) a comparison of the tracking area identifier associated with the second cell to the tracking area identifier associated with the first cell, (ii) the first set of one or more reselection parameters, (iii) the second set of one or more reselection parameters, and (iv) a set of one or more reselection criteria.

In still another embodiment, a communication device includes a network interface configured to, while the communication device is served by a first cell, receive a first set of one or more reselection parameters. The first set of one or more reselection parameters includes a tracking area identifier associated with a second cell. The second cell neighbors the first cell. The network interface is also configured to compare the tracking area identifier associated with the second cell to a tracking area identifier associated with the first cell. The network interface is further configured to determine a second set of one or more reselection parameters associated with the second cell. The network interface is yet further configured to determine whether to reselect the second cell based on (i) a comparison of the tracking area identifier associated with the second cell to the tracking area identifier associated with the first cell, (ii) the first set of one or more reselection parameters, (iii) the second set of one or more reselection parameters, and (iv) a set of one or more reselection criteria.

DETAILED DESCRIPTION

In embodiments described below, cell reselection techniques are utilized to allow a user device to reselect a new cell while reducing or eliminating rapid transitions between cells of different tracking areas. In general, the disclosed cell reselection techniques account for the tracking areas associated with cells, and/or associated with signal frequencies utilized by cells. In some embodiments the network (e.g., a network controller) considers tracking area information, and assigns cell reselection parameters in a such a manner that it is more difficult for a user device to reselect a cell in a different tracking area than a cell in the current tracking area. In other embodiments, the user device directly considers the tracking area information when deciding whether to reselect a neighbor cell.

As used herein, the term "reselecting" generally conforms to the standard usage in the art, e.g., as used in the $3^{rd}$ Generation Partnership Project Long Term Evolution (3GPP LTE) Specification. Accordingly, the phrase "reselecting a cell" does not necessarily require or imply that the cell in question has been selected at any previous time. Rather, this usage serves to distinguish the cell "reselection" process from the initial cell "selection" process.

Figure 1:
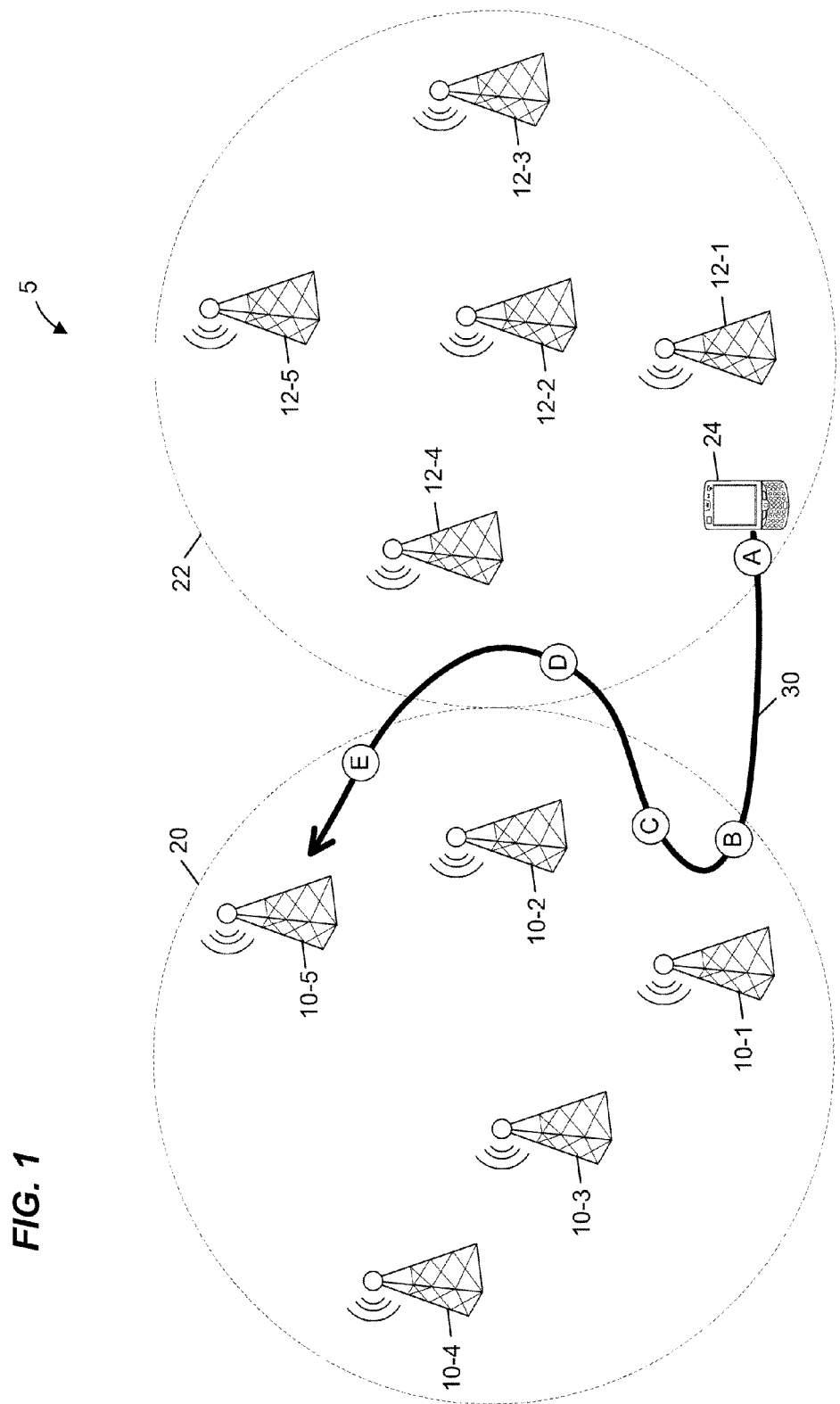
FIG. 1 is a block diagram of an example cellular network in which cell reselection techniques are implemented, according to an embodiment.

FIG. 1 is a block diagram of an example cellular network 5 in which cell reselection techniques are implemented, according to an embodiment. The cellular network 5 includes a first plurality of base stations 10 and a second plurality of base stations 12, with each of base stations 10 and 12 being associated with a different cell. The base stations 10 and their corresponding cells are associated with a first tracking area 20, and the base stations 12 and their corresponding cells are associated with a second tracking area 22. In an embodiment, each of the base stations 10 of the first tracking area 20 transmits a first type of paging message (e.g., at a first interval), and each of the base stations 12 of the second tracking area 22 transmits a second type of paging message (e.g., at a second interval).

In an embodiment, each of the cells of base stations 10 and 12 is associated with a neighbor cell list. In an embodiment, each neighbor cell list is stored in a memory of the base station 10 or 12 of the cell associated with the list. The cells included on a neighbor cell list are cells that, with respect to user devices currently served by the cell associated with the list, are candidates suitable for cell reselection, in an embodiment. The neighbor cell list includes information such as an identification of each listed cell and the signal frequency utilized by each listed cell, in an embodiment. Moreover, in an embodiment, each cell on the neighbor cell list is associated with one or more reselection parameters utilized by user devices when deciding whether to reselect that particular cell. For example, in one embodiment, the reselection parameters associated with a particular neighbor cell include a priority of a signal frequency utilized by the neighbor cell and a received signal power threshold to be compared against signals received from a base station of the neighbor cell. The reselection parameters are assigned to the various cells on the neighbor cell list by a network controller of the cellular network 5 (e.g., by a network controller included in a base station 10 or 12 of the cell associated with the list), and are transmitted to user devices (e.g., by a base station 10 or 12 of the cell associated with the list) for use in cell reselection, in an embodiment. Various suitable reselection parameters and their uses are discussed in more detail below.

In some scenarios, a user device 24 (e.g., a mobile telephone, in an embodiment) moves within the geographic area of the cellular network 5. A path 30 including locations "A" through "E" depicts a route that, in one example scenario, the user device 24 follows over time. In some scenarios (e.g., where user device 24 powers up at location "A") and embodiments, user device 24 performs initial cell selection at location "A". For example, in one scenario and embodiment, user device 24 initially selects the cell associated with base station 12-1, after which that cell begins to serve the user device 24. In some embodiments, a cell "serves" a user device by supporting active communication between the user device and the cellular network 5 via a base station of the serving cell, and by providing paging, emergency, and/or system information messages to the user device when the user device is in an idle mode.

In one scenario and embodiment, user device 24 traverses path 30 while in an idle mode. As user device 24 moves toward location "B" and nearer to base station 10-1, the signal quality between user device 24 and base station 10-1 of the neighboring cell tends to improve, while the signal quality between user device 24 and base station 12-1 of the current cell tends to degrade. Depending on whether various suitable reselection parameters satisfy certain cell reselection criteria (as discussed further below), user device 24 decides whether to reselect the cell of base station 10-1. For example, in an embodiment, whether the user device reselects the cell of base station 10-1 depends on whether reselection parameters corresponding to the cell in a neighbor cell list satisfy the cell reselection criteria. In one scenario and embodiment, user device 24 reselects the cell of base station 10-1, and sends a first tracking area update to base station 10-1 to inform the cellular network 5 that user device 24 is now in tracking area 20.

As user device 24 moves toward location "C" and nearer to base station 10-2, the signal quality between user device 24 and base station 10-2 of the neighboring cell tends to improve, while the signal quality between user device 24 and base station 10-1 of the current cell tends to degrade. Depending on whether various suitable reselection parameters satisfy certain cell reselection criteria, user device 24 decides whether to reselect the cell of base station 10-2. For example, in an embodiment, whether the user device reselects the cell of base station 10-2 depends on whether reselection parameters corresponding to the cell in a neighbor cell list satisfy the cell reselection criteria. In one scenario and embodiment, user device 24 reselects the cell of base station 10-2, but no tracking area update is sent to base station 10-2 because the user device 24 remains in a cell associated with tracking area 20.

As user device 24 moves toward location "D" and nearer to base station 12-4, the signal quality between user device 24 and base station 12-4 of the neighboring cell tends to improve, while the signal quality between user device 24 and base station 10-2 of the current cell tends to degrade. Depending on whether various reselection parameters satisfy certain suitable cell reselection criteria, user device 24 decides whether to reselect the cell of base station 12-4. For example, in an embodiment, whether the user device reselects the cell of base station 12-4 depends on whether reselection parameters corresponding to the cell in a neighbor cell list satisfy the cell reselection criteria. In one scenario and embodiment, user device 24 reselects the cell of base station 12-4, and sends a second tracking area update to base station 12-4 to inform the cellular network 5 that user device 24 is back in tracking area 22.

Next, as user device 24 moves toward location "E" and nearer to base station 10-5, the signal quality between user device 24 and base station 10-5 of the neighboring cell tends to improve, while the signal quality between user device 24 and base station 12-4 of the current cell tends to degrade. Depending on whether various suitable reselection parameters satisfy certain cell reselection criteria, user device 24 decides whether to reselect the cell of base station 10-5. For example, in an embodiment, whether the user device reselects the cell of base station 10-5 depends on whether reselection parameters corresponding to the cell in a neighbor cell list satisfy the cell reselection criteria. In one scenario and embodiment, user device 24 reselects the cell of base station 10-5, and sends a third tracking area update to base station 10-5 to inform the cellular network 5 that user device 24 is now back in tracking area 20.

Thus, in this example scenario, user device 24 transmits three separate tracking area updates (i.e., at locations "B", "D", and "E") when following path 30. If user device 24 traverses the entirety of path 30 in a short enough time, however, some of the tracking area updates (e.g., at "B" and "D", or at "D" and "E") may be unnecessary. Transmission of these extra tracking area updates causes an unnecessarily heavy signaling load, and increases the risk of losing paging messages intended for user device 24.

In an embodiment, the cellular network 5 is a 3GPP LTE network (i.e., conforms to the 3GPP LTE Specification). In this embodiment, and using 3GPP LTE terminology, each of the base stations 10 and 12 is referred to as an "evolved Node B" or "E-UTRAN Node B" (eNB), and user device 24 is referred to as "user equipment" (UE). In other embodiments, the cellular network 5 is a different suitable type of network, or a combination of multiple networks. For example, the cellular network 5 is a WiMAX network, a $3^{rd}$ Generation Partnership Project Universal Mobile Telecommunications System (3GPP UMTS) network, a hybrid UMTS/LTE network, etc., according to various embodiments.

Figure 2:
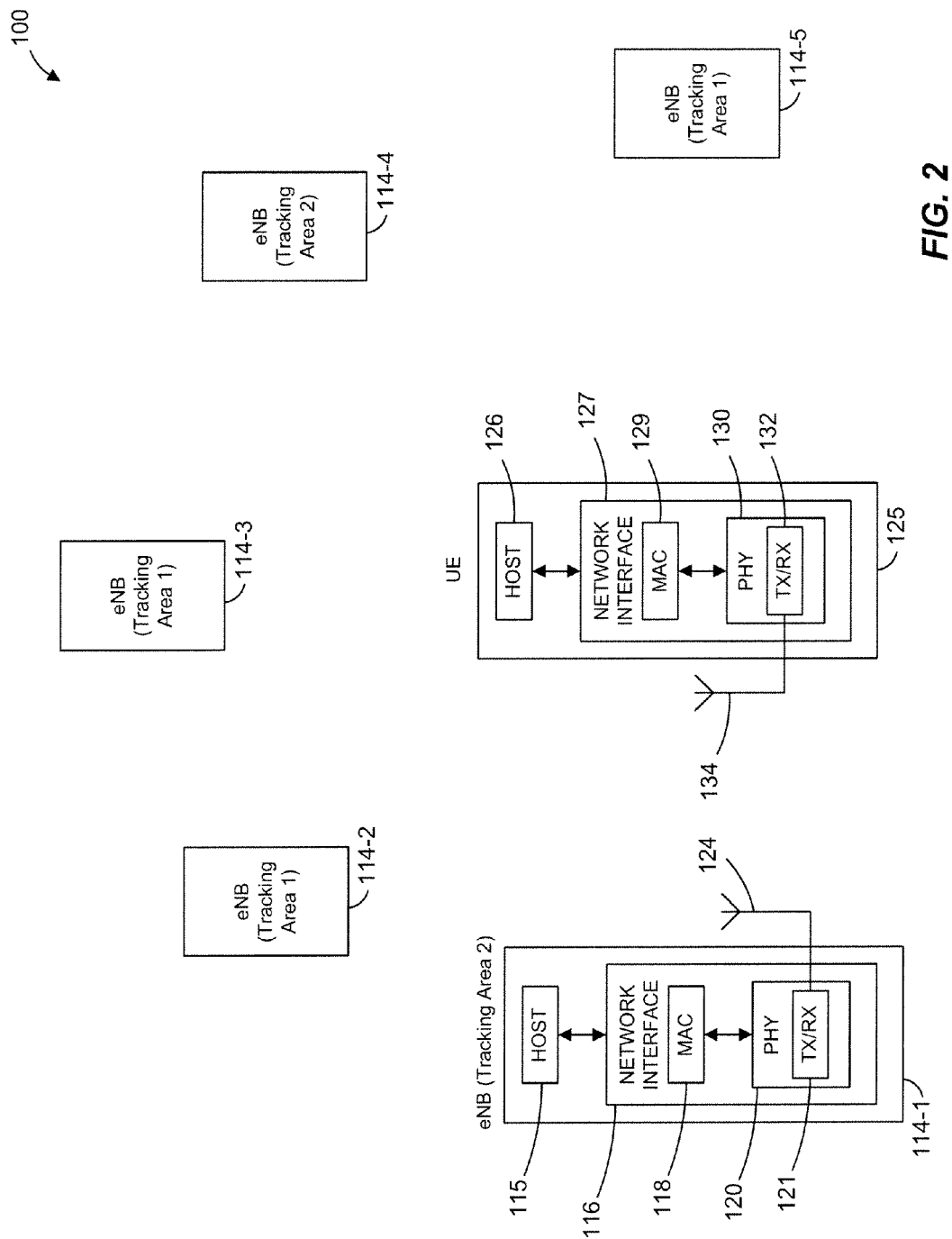
FIG. 2 is a block diagram of another example cellular network in which cell reselection techniques are implemented, according to an embodiment.

FIG. 2 is a block diagram of another example cellular network 100 in which cell reselection techniques are implemented, according to an embodiment. For ease of explanation, the communication devices of FIG. 2 are referred to using 3GPP LTE terminology (e.g., eNB and UE). Other embodiments, however, include other suitable types of communication devices, such as WiMAX communication devices, etc.

The example cellular network 100 includes a plurality of eNBs 114. Although five eNBs 114 are illustrated in FIG. 2, the cellular network 100 includes a different suitable number (e.g., 2, 3, 4, 6, etc.) of eNBs in other embodiments. The eNB 114-1 includes a host processor 115 coupled to a network interface 116. The host processor 115 comprises a processor that executes machine readable instructions, in an embodiment. The network interface 116 includes a medium access control (MAC) processing unit 118 and a physical layer (PHY) processing unit 120. The PHY processing unit 120 includes a transceiver 121 coupled to an antenna 124. Although one transceiver 121 and one antenna 124 are illustrated in FIG. 2, the eNB 114-1 includes a different suitable number (e.g., 2, 3, 4, 5, etc.) of transceivers 121 and antennas 124 in other embodiments. In various embodiments, one, some, or all of the eNBs 114-2 through 114-5 have a structure the same as or similar to the eNB 114-1.

The example cellular network 100 also includes a UE 125. Although one UE 125 is illustrated in FIG. 2, the cellular network 100 includes a different suitable number (e.g., 2, 3, 4, 5, etc.) of UEs 125 in various scenarios and embodiments. UE 125 is configured to communicate with any one of eNBs 114 (depending on which cell is selected, reselected, or the recipient of a cell handover), and includes a host processor 126 coupled to a network interface 127. The host processor 127 comprises a processor that executes machine readable instructions, in an embodiment. The network interface 127 includes a MAC processing unit 129 and a PHY processing unit 130. The PHY processing unit 130 includes a transceiver 132, and the transceiver 132 is coupled to an antenna 134. Although one transceiver 132 and one antenna 134 are illustrated in FIG. 2, the UE 125 includes a different suitable number (e.g., 2, 3, 4, 5, etc.) of transceivers 132 and antennas 134 in other embodiments. In an embodiment, UE 125 is configured to selectively operate in either an idle mode or an active communication mode. In some embodiments, UE 125 is further configured to selectively operate in one or more additional modes.

In the example embodiment shown in FIG. 2, eNBs 114-1, 114-2, 114-3, 114-4, and 114-5 correspond to base stations 12-1, 10-1, 10-2, 12-4, and 10-5, respectively, of FIG. 1, and UE 125 corresponds to user device 24 of FIG. 1. Accordingly, eNBs 114-2, 114-3, and 114-5 are associated with cells in a first tracking area ("Tracking Area 1", corresponding to tracking area 20 in FIG. 1) and eNBs 114-1 and 114-4 are associated with cells in a second tracking area ("Tracking Area 2", corresponding to tracking area 22 in FIG. 1). In an embodiment, a neighbor cell list associated with the cell of eNB 114-1 includes an identification of the neighboring cell of eNB 114-2 and associated information (signal frequency, reselection parameters, etc.). Similarly, in an embodiment, a neighbor cell list associated with the cell of eNB 114-2 includes an identification of the neighboring cells of eNB 114-1 and eNB 114-3 and associated information for each, a neighbor cell list associated with the cell of eNB 114-3 includes an identification of the neighboring cells of eNB 114-2 and eNB 114-4 and associated information for each, a neighbor cell list associated with the cell of eNB 114-4 includes an identification of the neighboring cells of eNB 114-3 and eNB 114-5 and associated information for each, and a neighbor cell list associated with the cell of eNB 114-5 includes an identification of the neighboring cell of eNB 114-4 and associated information.

In operation, the reselection parameters from a particular neighbor cell list are transmitted to UE 125 when UE 125 is served by the eNB 114 of the cell associated with the list, in an embodiment. In an embodiment, reselection parameters are transmitted to UE 125 by the eNB 114 of the cell currently serving UE 125 (e.g., over a control channel). In an embodiment where cellular network 100 is a 3GPP LTE network, for example, the reselection parameters are included in system information blocks (SIBs) transmitted to UE 125 by the eNB 114 of the current cell. UE 125 (e.g., network interface 127 of UE 125) then decides whether to reselect particular neighbor cells based on the received reselection parameters, additional measured reselection parameters determined by UE 125, and various suitable reselection criteria, in an embodiment.

Prior to being sent to UE 125 (e.g., by an eNB 114 of a current cell), the reselection parameters are determined by a network controller, in an embodiment. In some embodiments, an eNB 114 of the current cell (e.g., a host processor of the eNB 114, similar to host processor 115 of eNB 114-1) acts as the network controller for purposes of assigning the reselection parameters to neighbor cells of the current cell. In other embodiments, the network controller is a network device (not shown in FIG. 2) that communicates with one or more other eNBs (e.g., with an eNB 114 of the current cell) via a wired backbone network (also not shown in FIG. 2).

In one example embodiment and scenario, eNB 114-1 transmits to UE 125 one or more SIBs that include an identification of a neighbor cell associated with eNB 114-2 and a corresponding signal power threshold, and the PHY processing unit 130 of UE 125 measures a received signal power from eNB 114-2. In this example embodiment, the network interface 127 of UE 125 decides whether to reselect the identified neighbor cell at least in part by comparing the received signal power from eNB 114-2 to the signal power threshold received from eNB 114-1, according to some cell reselection criteria. For example, in one embodiment, the cell reselection criteria requires that the received signal power be greater than the threshold for cell reselection to occur. Other, more complex examples of cell reselection criteria are discussed below. In one embodiment, UE 125 (e.g., the network interface 127, in an embodiment) is aware a priori of the criteria for deciding whether to reselect a neighbor cell, while the reselection parameters to be checked against the criteria are a combination of values received from the network 100 and measured values determined by UE 125 (e.g., by PHY processing unit 130). In other embodiments, the reselection criteria themselves are at least in part provided to UE 125 by the network 100 (e.g., via an eNB 114 of a current cell).

Figure 3:
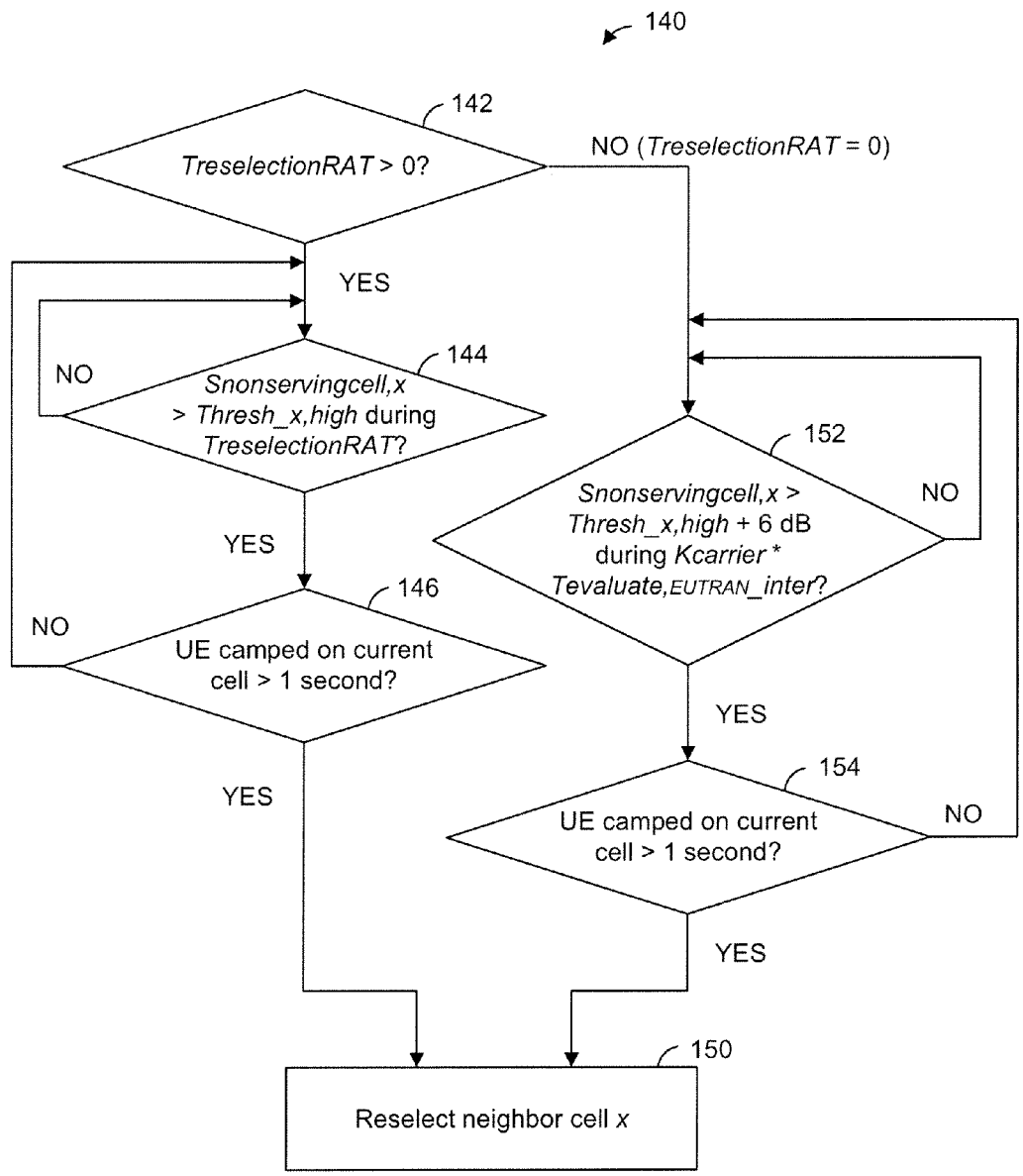
FIG. 3 is a flow diagram of a first portion of a prior art cell reselection technique.

Examples of cell reselection criteria, and corresponding reselection parameters, are now described. First, a 3GPP LTE prior art cell reselection technique is described with reference to FIGS. 3-5. FIGS. 3, 4, and 5 respectively correspond to cell reselection criteria applied when a neighbor cell utilizes a signal frequency with a priority that is higher than, equal to, or lower than a priority of a signal frequency utilized by the cell currently serving a user device. The methods of FIGS. 3-5 are performed by a UE in a cellular network, in an embodiment.

FIG. 3 is a flow diagram of a first portion 140 of the prior art cell reselection technique, applied when a neighbor cell x being considered for cell reselection utilizes a signal frequency having a higher priority than a signal frequency utilized by the current cell. At block 142, it is determined whether a reselection parameter TreselectionRAT is greater than zero. The parameter TreselectionRAT indicates an amount of time during which one or more indications of signal strength determined by the UE performing the method 140 (e.g., an indication of the strength of a signal from a cell currently serving the UE, and/or of a signal from a neighbor cell) are required to be above or below a particular threshold in order for cell reselection to occur. The parameter TreselectionRAT, in an embodiment, is a timer value specific to a particular signal frequency utilized by the neighbor cell x and to a particular radio access technology (RAT) utilized by the neighbor cell x, and is transmitted by an eNB of the current cell to the UE in an SIB.

If it is determined at block 142 that the parameter TreselectionRAT is greater than zero, flow proceeds to block 144. At block 144, it is determined whether a parameter $S_{nonservingcell,x}$ is greater than a parameter $Thresh\_x,high$ for a time at least equal to TreselectionRAT. The parameter $S_{nonservingcell,x}$ indicates a power level of a signal received from the neighbor cell x, as measured by the UE performing the method 140. More specifically, $S_{nonservingcell,x}$ is a linear function of a reference signal receive power (RSRP) obtained by adding or subtracting certain offset values. The parameter $Thresh\_x,high$ is a threshold specific to a particular signal frequency utilized by the neighbor cell x, and is transmitted by an eNB of the current cell to the UE in an SIB.

If it is determined at block 144 that the parameter $S_{nonservingcell,x}$ is greater than the parameter $Thresh\_x,high$ for a time at least equal to TreselectionRAT, flow proceeds to block 146. At block 146, it is determined whether the UE performing the method 140 has been camped on the current cell for more than one second. In 3GPP LTE terminology, a UE is "camped" on a cell if the UE has completed a cell selection or reselection process, chosen the cell, and is monitoring for system information and (in most instances) paging information.

If it is determined at block 146 that the UE has been camped on the current cell for more than one second, flow proceeds to block 150. At block 150, the neighbor cell x is reselected by the UE performing the method 140.

If it is determined at block 144 that the parameter $S_{nonservingcell,x}$ is not greater than the parameter $Thresh\_x,high$ for a time at least equal to TreselectionRAT, or if it is determined at block 146 that the UE performing the method 140 has not been camped on the current cell for more than one second, flow proceeds back to block 144 (i.e., further received signal level measurements are made by the UE, etc.).

If it is determined at block 142 that the parameter TreselectionRAT is not greater than zero (in which case TreselectionRAT is zero), flow proceeds to block 152. At block 152, it is determined whether the parameter $S_{nonservingcell,x}$ is greater than $Thresh\_x,high+6$ dB for a time at least equal to $Kcarrier*Tevaluate,EUTRAN\_inter$. The parameter Kcarrier is equal to the number of inter-frequency carriers (i.e., the number of sets in which all cells on the neighbor cell list utilize the same frequency), and is inferred by the UE performing the method 140 from an SIB received from an eNB of the current cell. The parameter $Tevaluate,EUTRAN\_inter$ indicates, when multiplied by Kcarrier, an amount of time during which one or more indications of signal strength determined by the UE performing the method 140 (e.g., an indication of the strength of a signal from a cell currently serving the UE, and/or of a signal from a neighbor cell) are required to be above or below a particular threshold in order for cell reselection to occur. The parameter Tevaluate,EUTRAN_inter is a timer value that varies from 5.12 to 7.68 seconds based on a discontinuous reception (DRX) cycle length, and is predetermined according to the 3GPP LTE Specification. A UE stores the timer value a priori, and then chooses the correct value based on the DRX cycle length as configured by the eNB.

If it is determined at block 152 that the parameter Snonservingcell,x is greater than Thresh_x,high+6 dB for a time at least equal to Kcarrier*Tevaluate,EUTRAN_inter, flow proceeds to block 154. At block 154, it is determined whether the UE performing the method 140 has been camped on the current cell for more than one second.

If it is determined at block 154 that the UE has been camped on the current cell for more than one second, flow proceeds to block 150 and neighbor cell x is reselected. If it is determined at block 152 that the parameter Snonservingcell,x is not greater than Thresh_x,high+6 dB for a time at least equal to Kcarrier*Tevaluate,EUTRAN_inter, or if it is determined at block 154 that the UE performing the method 140 has not been camped on the current cell for more than one second, flow proceeds back to block 152 (i.e., further received signal level measurements are made by the UE, etc.).

Figure 4A:
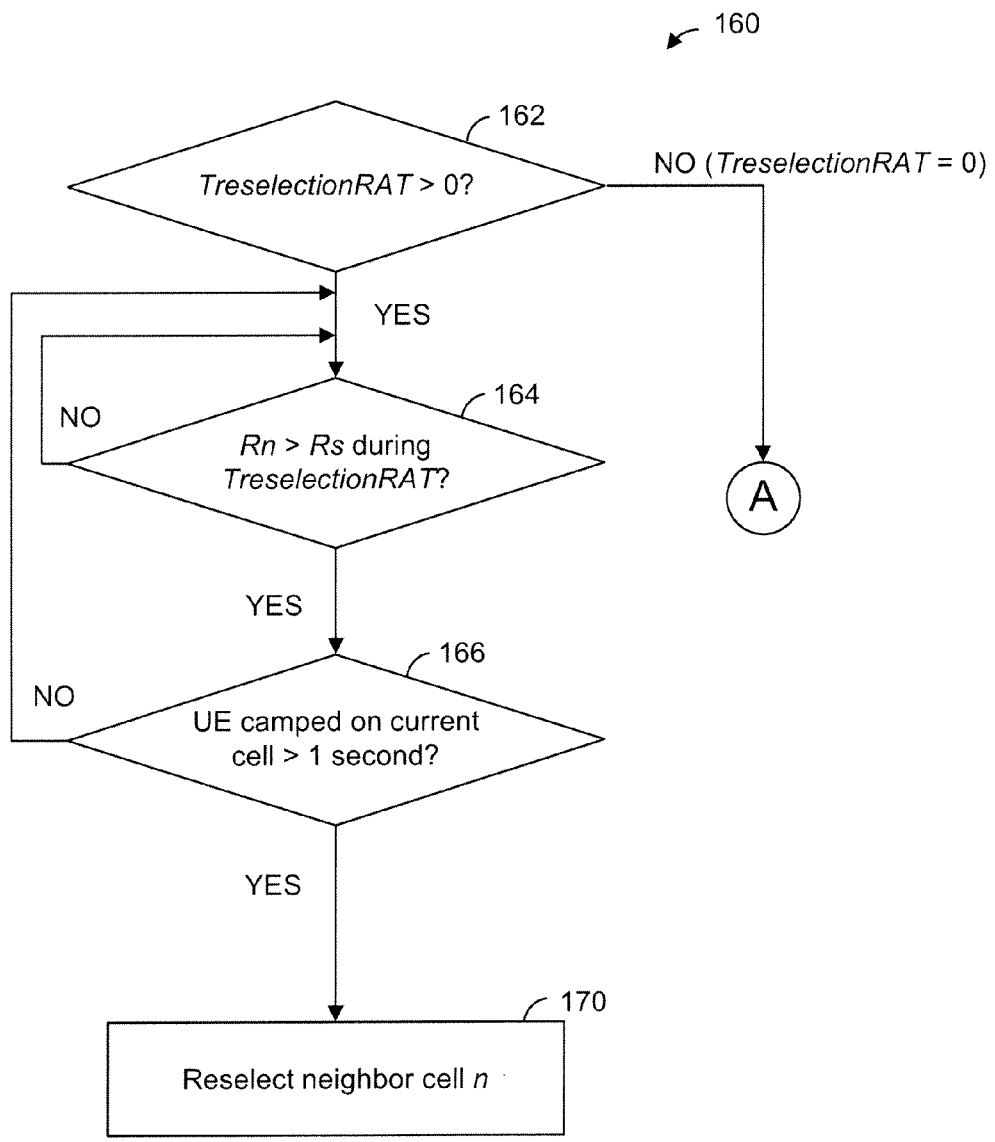
FIGS. 4A-4B are flow diagrams of a second portion of the prior art cell reselection technique.
Figure 4B:
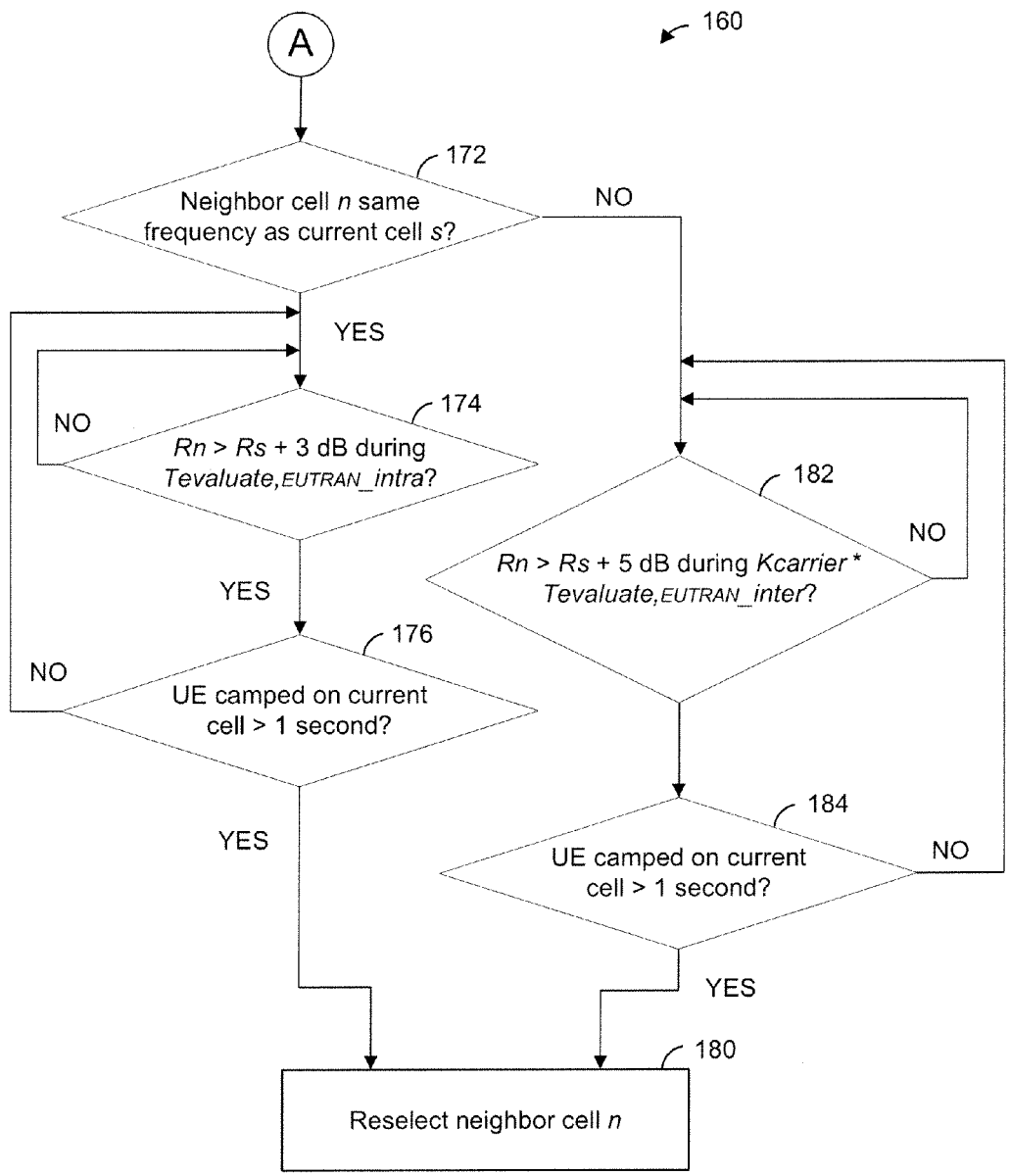

FIGS. 4A-4B are flow diagrams of a second portion 160 of the prior art cell reselection technique, applied when a neighbor cell n being considered for cell reselection utilizes a signal frequency having the same priority as a signal frequency utilized by a current cell s (e.g., where the neighbor cell n utilizes the same signal frequency as the current cell s). The variable n is used in method 160 to denote the neighbor cell under consideration rather than x (as in method 140 of FIG. 3) in order to maintain consistency with 3GPP LTE terminology for cell reselection parameters.

Referring first to FIG. 4A, it is determined at block 162 whether the reselection parameter TreselectionRAT is greater than zero. The parameter TreselectionRAT is described in connection with block 142 of FIG. 3.

If it is determined at block 162 that the parameter TreselectionRAT is greater than zero, flow proceeds to block 164. At block 164, it is determined whether a parameter Rn is greater than a parameter Rs for a time at least equal to TreselectionRAT. The parameter Rn indicates a received power level of a signal from the neighbor cell n, as measured by the UE performing the method 160. More specifically, Rn is equal to Qmeas,n−Qoffset, where Qmeas,n is an RSRP of the neighbor cell n as measured by the UE. Qoffset is equal to Qoffset_cell+Qoffset_freq, where Qoffset_cell is an offset specific to the neighbor cell n and Qoffset_freq is an offset specific to a signal frequency utilized by the neighbor cell n. As the cell-specific parameter Qoffset_cell is increased, it becomes more difficult for a UE performing the method 160 to reselect that cell. Similarly, as the frequency-specific parameter Qoffset_freq is increased, it becomes more difficult for a UE performing the method 160 to reselect a cell using that signal frequency. Both Qoffset_cell and Qoffset_freq are transmitted by an eNB of the current cell s to the UE in an SIB. The parameter Rs indicates a received power level of a signal from the current cell s, also as measured by the UE performing the method 160. More specifically, Rs is equal to Qmeas,s+Qhyst, where Qmeas,s is an RSRP of the current cell s as measured by the UE. Qhyst is a hysteresis value, and is transmitted by an eNB of the current cell s to the UE in an SIB.

If it is determined at block 164 that Rn is greater than Rs for a time at least equal to TreselectionRAT, flow proceeds to block 166. At block 166, it is determined whether the UE performing the method 160 has been camped on the current cell s for more than one second.

If it is determined at block 166 that the UE has been camped on the current cell s for more than one second, flow proceeds to block 170. At block 170, the neighbor cell n is reselected by the UE performing the method 160.

If it is determined at block 164 that the parameter Rn is not greater than the parameter Rs for a time at least equal to TreselectionRAT, or if it is determined at block 166 that the UE performing the method 160 has not been camped on the current cell s for more than one second, flow proceeds back to block 164 (i.e., further received signal level measurements are made by the UE, etc.).

If it is determined at block 162 that the parameter TreselectionRAT is not greater than zero (in which case TreselectionRAT is zero), flow proceeds to block 172 of FIG. 4B. Referring now to FIG. 4B, it is determined at block 172 whether the neighbor cell n utilizes the same signal frequency as the current cell s.

If it is determined at block 172 that the neighbor cell n utilizes the same signal frequency as the current cell s (i.e., that neighbor cell n is an "intra-frequency" cell), flow proceeds to block 174. At block 174, it is determined whether the parameter Rn is greater than Rs+3 dB for a time at least equal to Tevaluate,EUTRAN_intra. The parameter Tevaluate,EUTRAN_intra is a timer value that, similar to the parameter Tevaluate,EUTRAN_inter, varies from 5.12 to 7.68 seconds based on a DRX cycle length, and is predetermined according to the 3GPP LTE Specification, A UE stores the timer value a priori, and then chooses the correct value based on the DRX cycle length as configured by the eNB.

If it is determined at block 174 that Rn is greater than Rs+3 dB for a time at least equal to Tevaluate,EUTRAN_intra, flow proceeds to block 176. At block 176, it is determined whether the UE performing the method 160 has been camped on the current cell s for more than one second.

If it is determined at block 176 that the UE has been camped on the current cell s for more than one second, flow proceeds to block 180, which is the same as block 170 of FIG. 4A (i.e., neighbor cell n is reselected).

If it is determined at block 174 that the parameter Rn is not greater than Rs+3 dB for a time at least equal to Tevaluate, EUTRAN_intra, or if it is determined at block 176 that the UE performing the method 160 has not been camped on the current cell s for more than one second, flow proceeds back to block 174 (i.e., further received signal level measurements are made by the UE, etc.).

If it is determined at block 172 that the neighbor cell n does not utilize the same signal frequency as the current cell s (i.e., that neighbor cell n is an "inter-frequency" cell), flow proceeds to block 182. At block 182, it is determined whether Rn is greater than Rs+5 dB for a time at least equal to Kcarrier*Tevaluate,EUTRAN_inter. The parameters Kcarrier and Tevaluate,EUTRAN_inter are described above in connection with block 152 of FIG. 3.

If it is determined at block 182 that Rn is greater than Rs+5 dB for a time at least equal to Kcarrier*Tevaluate, EUTRAN_inter, flow proceeds to block 184. At block 184, it is determined whether the UE performing the method 160 has been camped on the current cell s for more than one second.

If it is determined at block 176 that the UE has been camped on the current cell s for more than one second, flow proceeds to block 180 and neighbor cell n is reselected.

If it is determined at block 182 that the parameter Rn is not greater than Rs+5 dB for a time at least equal to Kcarrier*Tevaluate,EUTRAN_intra, or if it is determined at block 184 that the UE performing the method 160 has not been camped on the current cell s for more than one second, flow proceeds back to block 182 (i.e., further received signal level measurements are made by the UE, etc.).

Figure 5A:
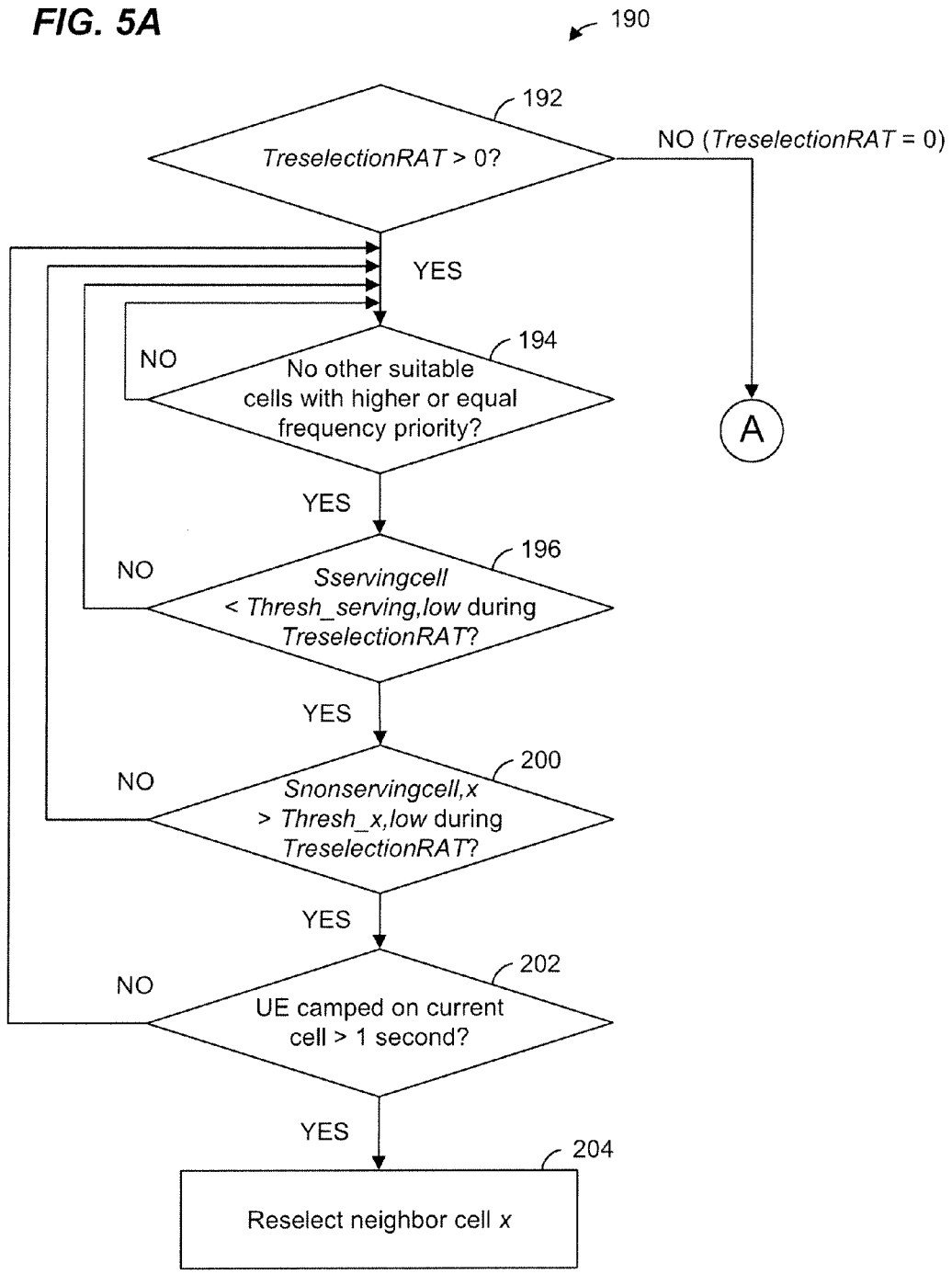
FIGS. 5A-5B are flow diagrams of a third portion of the prior art cell reselection technique.
Figure 5B:
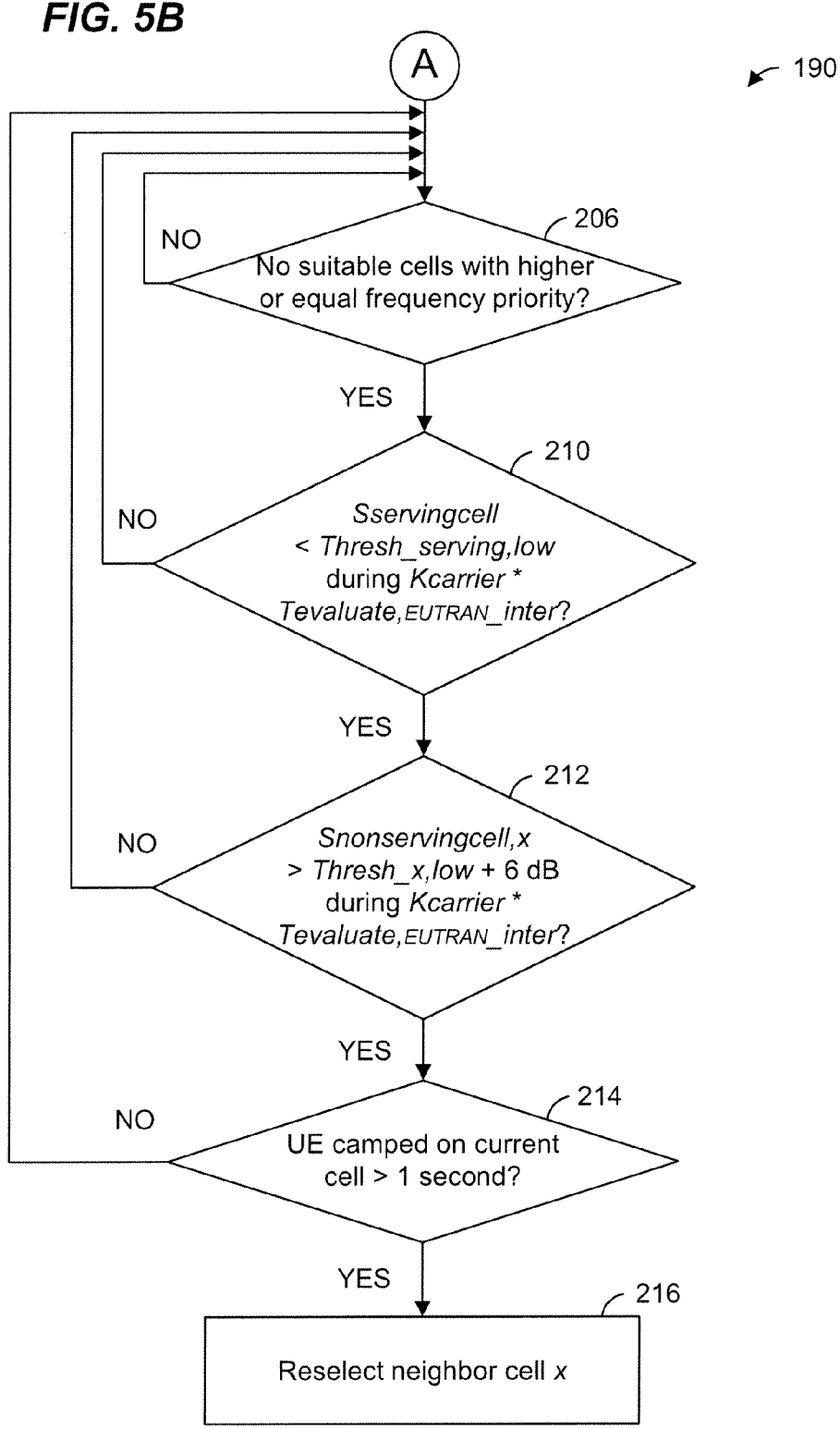

FIGS. 5A-5B are flow diagrams of a third portion 190 of the prior art cell reselection technique, applied when a neighbor cell x being considered for cell reselection utilizes a signal frequency having a lower priority than a signal frequency utilized by a current serving cell. In FIGS. 5A-5B, the variable x is again used to denote the neighbor cell under consideration in order to maintain consistency with 3GPP LTE terminology for cell reselection parameters.

Referring first to FIG. 5A, it is determined at block 192 whether the reselection parameter TreselectionRAT is greater than zero. The parameter TreselectionRAT is described above in connection with block 142 of FIG. 3.

If it is determined at block 192 that the parameter TreselectionRAT is greater than zero, flow proceeds to block 194. At block 194, it is determined whether there are no suitable cells that utilize a signal frequency having a priority higher or equal to the signal frequency utilized by the current cell. Using 3GPP LTE terminology, a "suitable" cell is a cell on which a UE is permitted to camp.

If it is determined at block 194 that there are any suitable cells utilizing a signal frequency having a priority higher or equal to the signal frequency utilized by the current cell, flow proceeds to block 196. At block 196, it is determined whether a parameter Sservingcell is less than a parameter Thresh_serving,low for a time at least equal to TreselectionRAT. The parameter Sservingcell indicates a power level of a signal received from an eNB of the current cell, as measured by the UE performing the method 190. More specifically, Sservingcell is a linear function of an RSRP obtained by adding or subtracting certain offset values. A high Sservingcell level indicates that the communication channel between the UE performing the method 190 and the cell currently serving the UE is still relatively strong, in which case there is no need for the UE to reselect a neighbor cell that uses a lower-priority signal frequency than the current cell. The parameter Thresh_serving,low is a threshold specific to a particular signal frequency utilized by the current cell, and is transmitted by an eNB of the current cell to the UE in an SIB.

If it is determined at block 196 that Sservingcell is less than Thresh_serving,low for a time at least equal to TreselectionRAT, flow proceeds to block 200. At block 200, it is determined whether the parameter Snonservingcell,x is greater than a parameter Thresh_x,low for a time at least equal to TreselectionRAT. The parameter Snonservingcell,x is described above in connection with block 144 of FIG. 3. The parameter Thresh_x,low is a threshold specific to a particular signal frequency utilized by the neighbor cell x, and is transmitted by an eNB of the current cell to the UE in an SIB.

If it is determined at block 200 that Snonservingcell,x is greater than Thresh_x,low for a time at least equal to TreselectionRAT, flow proceeds to block 202. At block 202, it is determined whether the UE performing the method 190 has been camped on the current cell for more than one second.

If it is determined at block 202 that the UE has been camped on the current cell for more than one second, flow proceeds to block 204. At block 204, the neighbor cell x is reselected by the UE performing the method 190.

If it is determined at block 194 that no suitable cells with a higher or equal frequency priority exist, determined at block 196 that Sservingcell is not less than Thresh_serving,low for a time at least equal to TreselectionRAT, determined at block 200 that Snonservingcell,x is not greater than Thresh_x,low for a time at least equal to TreselectionRAT, or determined at block 202 that the UE performing the method 190 has not been camped on the current cell for more than one second, flow proceeds back to block 194 (i.e., further received signal level measurements are made by the UE, etc.).

If it is determined at block 192 that the parameter TreselectionRAT is not greater than zero (in which case TreselectionRAT is zero), flow proceeds to block 206 of FIG. 5B. Referring now to FIG. 5B, it is determined at block 206 whether there are no suitable cells that utilize a signal frequency having a priority higher or equal to the signal frequency utilized by the current cell.

If it is determined at block 206 that there are no other suitable cells utilizing a signal frequency having a priority higher or equal to the signal frequency utilized by the current cell, flow proceeds to block 210. At block 210, it is determined whether the parameter Sservingcell is less than the parameter Thresh_serving,low for a time at least equal to Kcarrier Tevaluate,EUTRAN_inter. The parameters Kcarrier and Tevaluate,EUTRAN_inter are described above in connection with block 152 of FIG. 3.

If it is determined at block 210 that Sservingcell is less than Thresh_serving,low for a time at least equal to Kcarrier*Tevaluate,EUTRAN_inter, flow proceeds to block 212. At block 212, it is determined whether the parameter Snonservingcell,x is greater than Thresh_x,low+6 dB for a time at least equal to Kcarrier*Tevaluate,EUTRAN_inter.

If it is determined at block 212 that Snonservingcell,x is greater than Thresh_x,low+6 dB for a time at least equal to Kcarrier*Tevaluate,EUTRAN_inter, flow proceeds to block 214. At block 214, it is determined whether the UE performing the method 190 has been camped on the current cell for more than one second.

If it is determined at block 214 that the UE has been camped on the current cell for more than one second, flow proceeds to block 216, which is the same as block 204 of FIG. 5A (i.e., neighbor cell x is reselected).

If it is determined at block 206 that no suitable cells with a higher or equal frequency priority exist, determined at block 210 that Sservingcell is not less than Thresh_serving,low for a time at least equal to Kcarrier*Tevaluate,EUTRAN_inter, determined at block 212 that Snonservingcell,x is not greater than Thresh_x,low+6 dB for a time at least equal to Kcarrier*Tevaluate,EUTRAN_inter, or determined at block 214 that the UE performing the method 190 has not been camped on the current cell for more than one second, flow proceeds back to block 206 (i.e., further received signal level measurements are made by the UE, etc.).

The prior art cell reselection technique of FIGS. 3-5B does not take into account whether a neighbor cell that is a candidate for cell reselection is within the same tracking area as the cell currently serving a user device. As a result, the prior art technique does not, by itself, lessen or eliminate the "ping pong" effect described above, where a user device switches between cells of different tracking areas at a relatively rapid rate, and creates a heavier signaling load by sending unnecessary tracking area updates. In embodiments described below, this shortcoming is addressed by accounting for tracking area information in the cell reselection process. In some embodiments, the network (e.g., a network controller) assigns cell reselection parameters based on tracking area information (as discussed below with reference to FIGS. 6 and 7) before those reselection parameters are provided to a user device. In other embodiments, the user device directly considers tracking area information when deciding whether to reselect a particular neighbor cell (as discussed below with reference to FIGS. 8 and 9).

Figure 6:
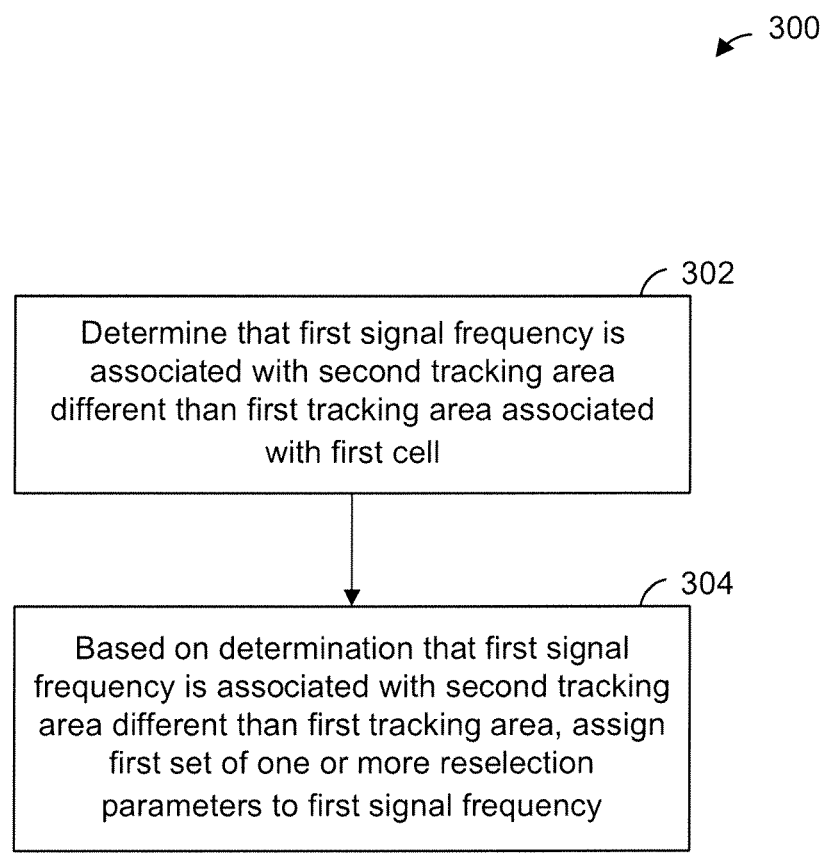
FIG. 6 is a flow diagram of an example method for assigning parameters for use in cell reselection, according to an embodiment.

In some embodiments where the network assigns cell reselection parameters based on tracking area information, the cell reselection parameters are assigned to particular signal frequencies. In these embodiments, the reselection parameters applied by a user device to reselect a neighbor cell depend on which signal frequency is utilized by the neighbor cell. FIG. 6 is a flow diagram of an example method 300 according to such an embodiment. The method 300 is implemented by a network controller, in some embodiments. In some of these embodiments, a base station such as one of base stations 10 or 12 of FIG. 1, or one of eNBs 114 of FIG. 2, includes the network controller. In other of these embodiments, the network controller is one or more devices that are not included in a base station, but is/are connected to a base station (e.g., via a wired backbone network). In some embodiments, the method 300 is implemented by multiple network devices (e.g., by a network controller that includes both a base station and one or more other, separate devices, all linked to a backbone network).

In an embodiment, the method 300 is used to determine whether a particular signal frequency (called the "first signal frequency" below) is heavily utilized by cells in a different tracking area than the tracking area of a reference cell (called the "first cell" below). At block 302, it is determined that the first signal frequency is associated with a second tracking area different than a first tracking area associated with the first cell. In an embodiment, the determination at block 302 includes determining that the first signal frequency is utilized by at least a threshold number of cells associated with the second tracking area (e.g., one cell, more than one cell, the number of cells associated with the first tracking area that utilize the first signal frequency, etc.). In some embodiments, the determination at block 302 includes comparing a tracking area code for the second tracking area to a tracking area code for the first tracking area.

In some embodiments, the determination at block 302 includes communicating with one or more base stations via a backbone network. For example, in one embodiment where the method 300 is implemented by a network controller included in a base station of the first cell, the determination at block 302 includes communicating via a backbone network with base stations of one or more other cells to determine their signal frequenc(ies) and tracking area code(s).

At block 304, based on the determination at block 302, a first set of one or more reselection parameters is assigned to the first signal frequency. In an embodiment, the reselection parameter(s) is/are assigned at least in part by setting the values of certain variables in a memory (e.g., in a relational database that stores the parameters indexed to the first signal frequency). In some embodiments, the reselection parameter(s) is/are assigned to multiple signal frequencies, of which one is the first signal frequency. In some embodiments, the assigned reselection parameters are additionally based on determinations other than the determination at block 302, such as a determination of a relative priority (e.g., higher, equal, or lower) of the first signal frequency as compared to a signal frequency utilized by the first cell.

In an embodiment, the method 300 further includes assigning the first set of one or more reselection parameters to a second cell that utilizes the first signal frequency. For example, in an embodiment, the method 300 includes determining that the second cell is on a neighbor cell list of the first cell, determining that the second cell utilizes the first signal frequency, and assigning the first set of one or more reselection parameters to the second cell based on the determination that the second cell utilizes the first signal frequency. In an embodiment, the reselection parameter(s) is/are assigned to the second cell by setting the values of certain variables in a memory (e.g., in a relational database that stores the parameters indexed to the second cell). In some embodiments, the method 300 further includes causing the first set of one or more reselection parameters to be transmitted via a control channel to a user device currently served by the first cell when the user device is in an idle mode. In this manner, a network controller implementing the method 300 allows the user device to utilize the reselection parameters to decide whether to reselect the second cell, in an embodiment. In some scenarios and/or embodiments, a user device also receives one or more additional parameters based on an identification of the neighbor cell under consideration (e.g., a cell-specific power offset such as Qoffset_cell, discussed above) for use in the cell reselection process. A cell-specific offset is used, for example, to make it more or less difficult for a user device performing the method 300 to reselect a particular cell (e.g., regardless of the signal frequency utilized by that cell), in some embodiments.

In an embodiment, reselection parameters assigned at block 304 include one or more of a priority, a timer value, a power ranking offset, a threshold, a whitelist that includes the first signal frequency, and a blacklist that excludes the first signal frequency. A signal frequency is on a "whitelist" if the network (e.g., a network controller performing the method 300) allows neighbor cells utilizing that signal frequency to be reselected, in an embodiment. Conversely, a signal frequency is on a "blacklist" if the network (e.g., a network controller performing the method 300) does not allow neighbor cells utilizing that signal frequency to be reselected, in an embodiment. In some embodiments, the reselection parameters assigned according to the method 300 are parameters needed to implement the prior art cell reselection technique illustrated in FIGS. 3-5B. For example, in some embodiments, the reselection parameters assigned at block 304 include one or more of the parameters TreselectionRAT, Qoffset_freq, Thresh_x,high, and Thresh_x,low. Additionally or alternatively, in some embodiments, the reselection parameters assigned at block 304 include a priority of the first signal frequency, utilized by a user device receiving the parameters to determine whether the first, second, or third portion of the prior art cell reselection technique of FIGS. 3, 4A and B, and 5A and B, respectively, is to be implemented. In some embodiments, the reselection parameters assigned according to the method 300 are parameters needed to implement another suitable cell reselection technique different than the prior art cell reselection technique illustrated in FIGS. 3-5B.

Generally, the method 300 is used to increase the difficulty of reselecting cells that utilize signal frequencies associated with different tracking areas than the first, reference cell, but not to increase the difficulty of reselecting cells that utilize certain other signal frequencies. Thus, in an embodiment, the method 300 further includes determining that a second signal frequency is associated with the first tracking area and/or determining that the second signal frequency is not associated with the second tracking area, and, based on the determination(s), assigning a second set of one or more reselection parameters to the second signal frequency. Generally, the first and the second set of reselection parameters are assigned in a manner such that a user device currently served by the first cell is less likely to reselect a cell that utilizes the first signal frequency (associated with the second tracking area), and more likely to reselect a cell that utilizes the second signal frequency (associated with the first tracking area and/or not associated with the second tracking area). Thus, for example, the second set of one or more reselection parameters includes one or more of a priority higher than a priority of the first set of reselection parameters, a timer value less than a timer value of the first set of reselection parameters, a power ranking offset lower than a power ranking offset of the first set of reselection parameters, a threshold lower than a threshold of the first set of reselection parameters, a whitelist that includes the second signal frequency, and a blacklist that excludes the second signal frequency, in various embodiments.

Figure 7:
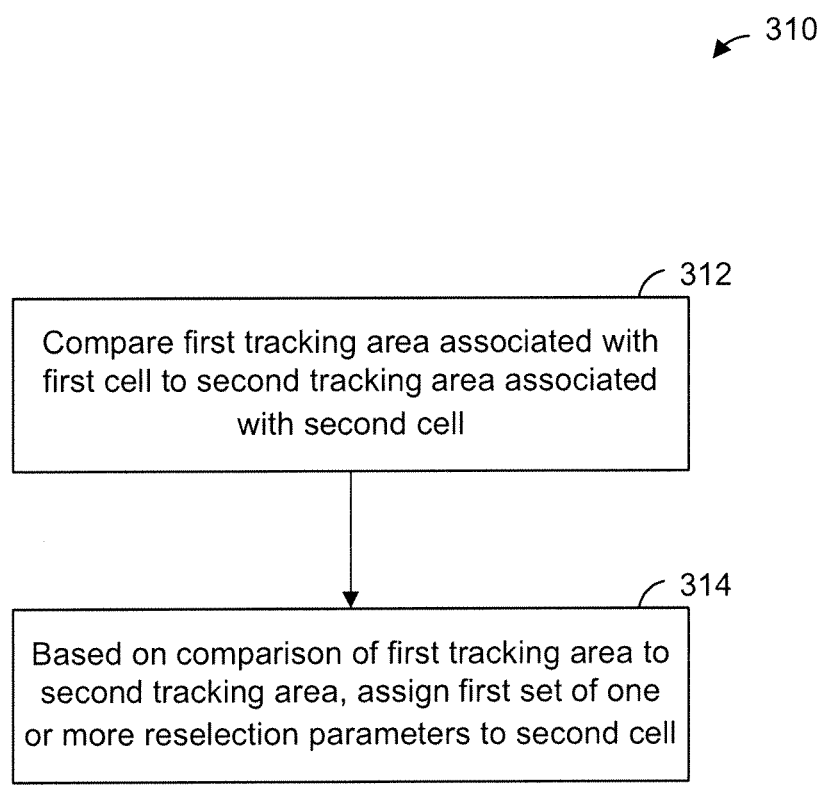
FIG. 7 is a flow diagram of another example method for assigning parameters for use in cell reselection, according to an embodiment.

In other embodiments where the network assigns cell reselection parameters based on tracking area information, the cell reselection parameters are assigned to particular cells (e.g., based on a cell identification of the neighbor cell to which the parameters are assigned) rather than to particular signal frequencies. FIG. 7 is a flow diagram of an example method 310 according to such an embodiment. The method 310 is implemented by a network controller, in some embodiments. In some of these embodiments, a base station such as one of base stations 10 or 12 of FIG. 1, or one of eNBs 114 of FIG. 2, includes the network controller. In other of these embodiments, the network controller is one or more devices that are not included in a base station, but is/are connected to a base station (e.g., via a wired backbone network). In some embodiments, the method 310 is implemented by multiple network devices (e.g., by a network controller that includes both a base station and one or, more other, separate devices, all linked to a backbone network).

In an embodiment, the method 310 is used to determine whether a particular neighbor cell (called the "second cell" below) is in a different tracking area than a reference cell (called the "first cell" below). At block 312, a first tracking area associated with the first cell is compared to a second tracking area associated with the second cell. In some embodiments, the second cell is a cell included in a neighbor cell list of the first cell. In an embodiment, the comparison at block 312 includes determining whether the second tracking area is different than the first tracking area. For example, in an embodiment, the comparison at block 312 includes determining whether a tracking area code for the second tracking area is different than a tracking area code for the first tracking area. In some embodiments, a network controller implementing the method 300 receives the first and second tracking area codes from base stations of the first and second cells, respectively. In one embodiment, where a network controller implementing the method 300 is included in a base station of the first cell, the network controller is aware a priori the first tracking area code, and receives the second tracking area code from a base station of the second cell (e.g., via a control channel or a wired backbone network).

At block 314, based on the comparison at block 312, a first set of one or more reselection parameters is assigned to the second cell. In an embodiment, the reselection parameter(s) is/are assigned at least in part by setting the values of variables in a memory (e.g., in a relational database that stores the reselection parameters indexed to the second cell). In some embodiments, the reselection parameter(s) is/are assigned to multiple cells, of which one is the second cell. In one embodiment, a first set of one or more reselection parameters is assigned to the second cell when the second tracking area is the same as the first tracking area, and a second set of one or more reselection parameters is assigned to the second cell when the second tracking area is different than the first tracking area.

In some embodiments, the method 310 further includes causing the first set of one or more reselection parameters to be transmitted via a control channel to a user device served by the first cell when the user device is in an idle mode. In this manner, a network controller implementing the method 310 allows the user device to utilize the reselection parameters to decide whether to reselect the second cell, in an embodiment.

In an embodiment, reselection parameters assigned at block 314 include a suitable power offset. For example, in an embodiment, a user device receiving the power offset utilizes the power offset by adding or subtracting the offset from a measured signal strength, in order to decrease or increase, respectively, the difficulty of reselecting the second cell. In some embodiments, the reselection parameters assigned according to the method 310 include at least one parameter needed to implement the prior art cell reselection technique illustrated in FIGS. 3-5B. For example, in one embodiment, the reselection parameters assigned at block 314 include the parameter Qoffset_cell. In some scenarios and/or embodiments, additional reselection parameters are assigned to the second cell based on a signal frequency utilized by the second cell. For example, in an embodiment, additional reselection parameters are assigned according to a method such as the method 300. In some embodiments, the reselection parameters assigned according to the method 310 are parameters needed to implement another suitable cell reselection technique different than the prior art cell reselection technique illustrated in FIGS. 3-5B.

Generally, the method 310 is used to increase the difficulty of reselecting cells in different tracking areas than the first, reference cell, but not to increase the difficulty of reselecting cells in the same tracking area. Thus, in an embodiment where the comparison at block 312 includes determining that the second tracking area is different than the first tracking area, the method 310 further includes determining that a third tracking area associated with a third cell is the same as the first tracking area and, based on that determination, assigning a second set of one or more reselection parameters to the third cell. In some of these embodiments, the second set of one or more reselection parameters includes at least a power offset that is lower than a power offset included in the first set of reselection parameters.

Depending on the scenario and/or embodiment, the methods of FIGS. 6 and 7 can have different advantages or drawbacks. For example, the current 3GPP LTE specification permits dynamic modification of a larger number of frequency-specific reselection parameters (e.g., priority, TreselectionRAT, Qoffset_freq, Thresh_x,high, and Thresh_x,low) than cell-specific reselection parameters (only Qoffset_cell). Thus, in some embodiments where methods 300 and 310 are utilized by a 3GPP LTE network, the method 300 of FIG. 6 provides a greater choice of reselection parameters than the method 310 of FIG. 7. On the other hand, assigning reselection parameters to signal frequencies rather than to cells can, in some scenarios, make it difficult to precisely target reselection parameters of neighboring cells in a different tracking area. For example, a particular signal frequency may be heavily utilized by cells of a different tracking area than the first, reference cell, but also utilized to some lesser degree in cells of the same tracking area as the first cell. Thus, in some scenarios and embodiments, it is difficult for the method 300 to increase the difficulty of reselecting cells in a different tracking area without also increasing the difficulty of reselecting certain cells in the same tracking area.

Figure 8:
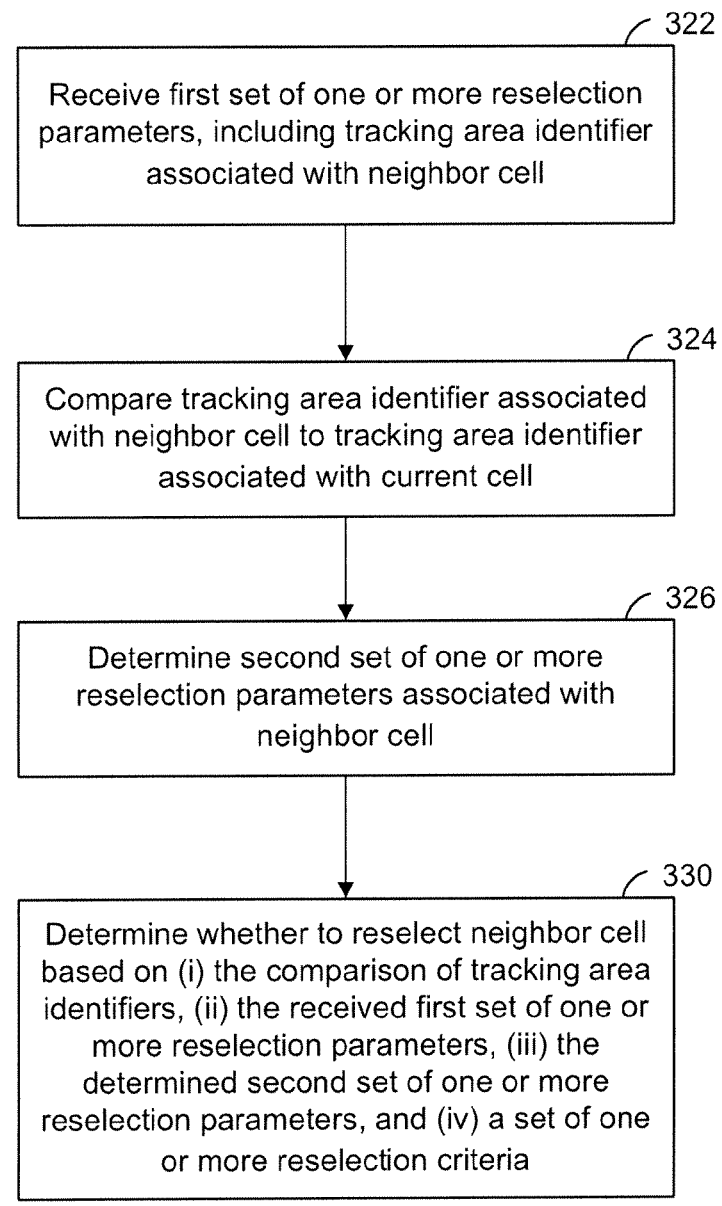
FIG. 8 is a flow diagram of an example method for performing cell reselection, according to an embodiment.
Figure 9A:
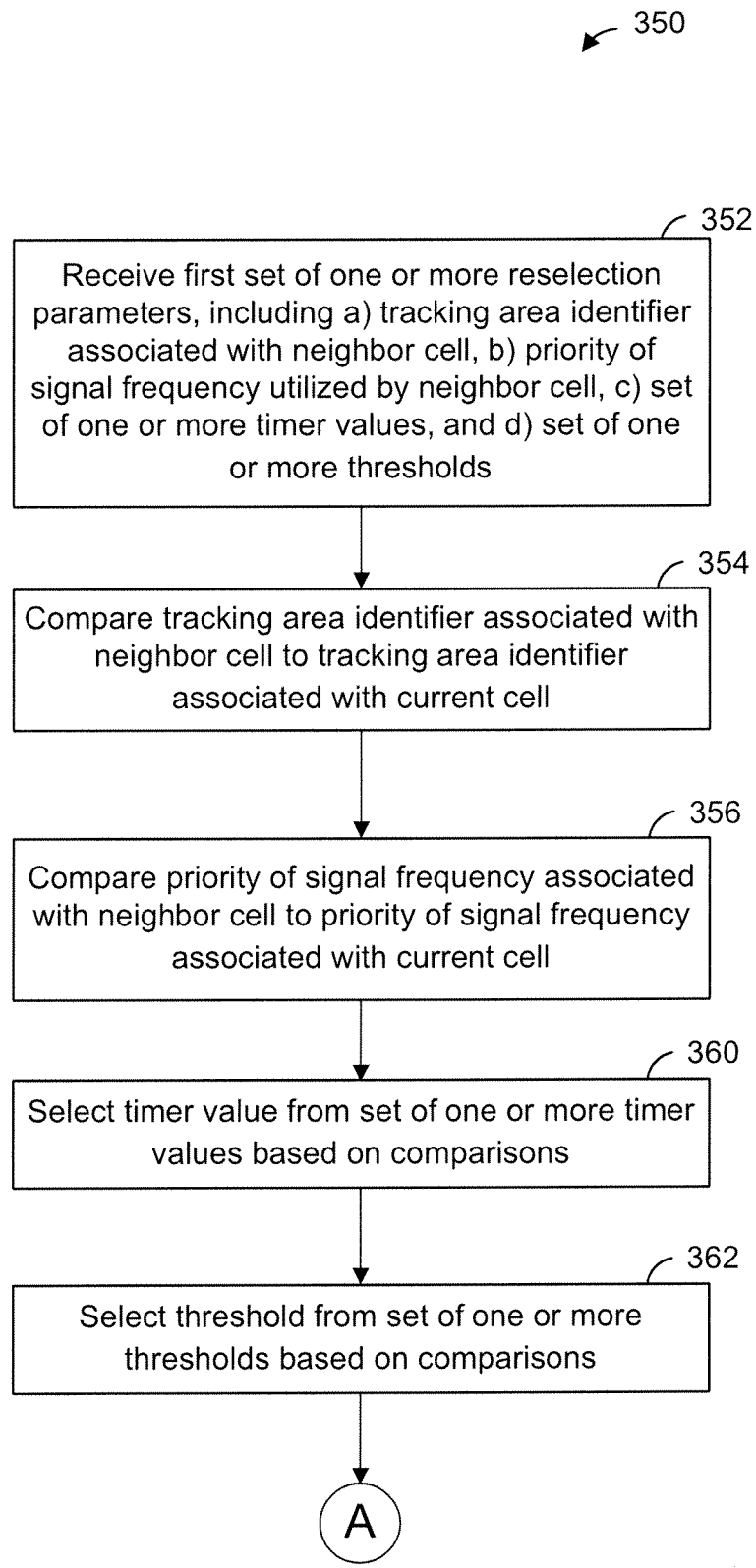
FIGS. 9A-9B are flow diagrams of another example method for performing cell reselection, according to an embodiment.
Figure 9B:
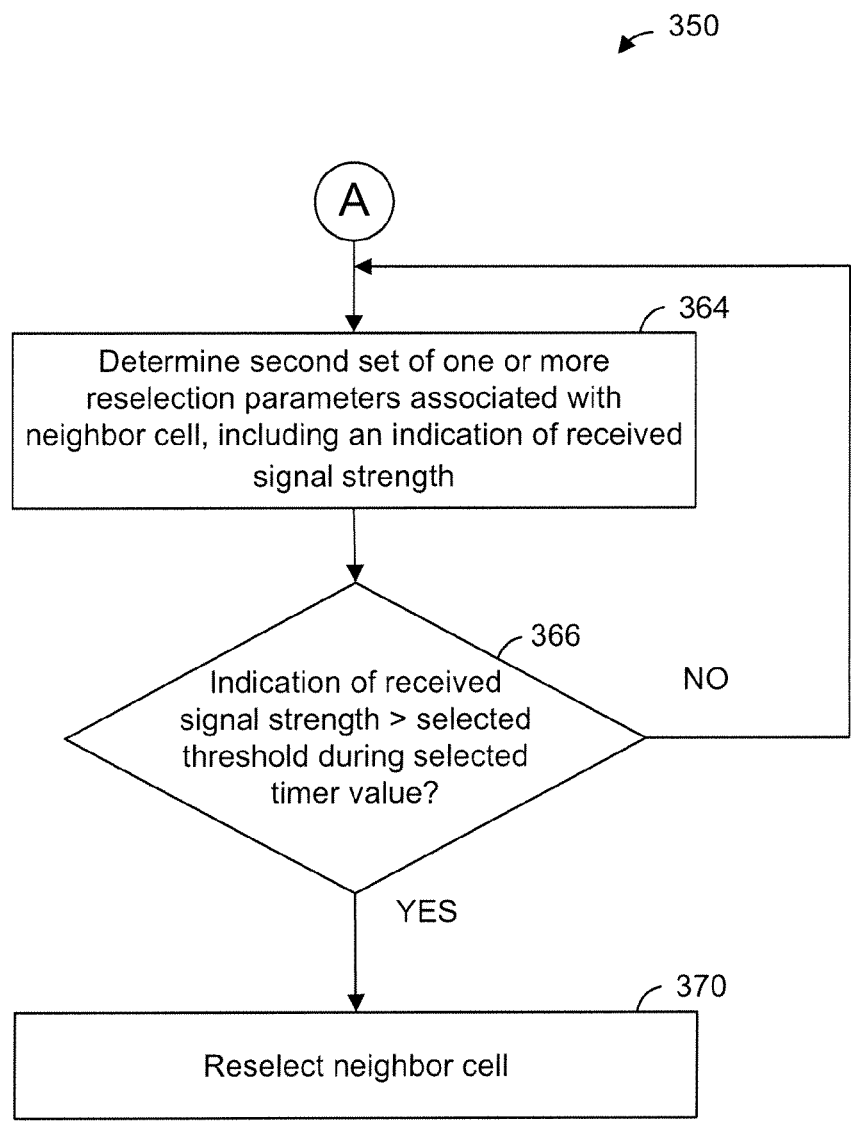

Whereas FIGS. 6 and 7 show embodiments where tracking area information is considered by the network, FIGS. 8, 9A and 9B illustrate embodiments where tracking area information is considered by the user device. FIG. 8 is a flow diagram of an example method 320 for performing cell reselection, according to an embodiment. The method 320 is implemented by a user device. For example, in an embodiment, the method 320 is implemented by the user device 24 of FIG. 1. As another example, in an embodiment, the method 320 is implemented by the UE 125 (e.g., by the network interface 127 of UE 125) of FIG. 2.

At block 322, a first set of one or more reselection parameters is received. In an embodiment, the first set of one or more reselection parameters is received from a base station of a cell currently serving a user device performing the method 320. Moreover, in some embodiments, the first set of reselection parameters is received via a control channel (e.g., in one or more SIBs) while the user device is in an idle mode. The first set of one or more reselection parameters includes a tracking area identifier (e.g., a tracking area code) associated with a neighbor cell. In an embodiment, the first set of reselection parameters also includes one or more suitable additional parameters. For example, in some embodiments, the first set of one or more reselection parameters also includes one or more reselection parameters assigned according to the method 300 of FIG. 6, and/or one or more reselection parameters assigned according to the method 310 of FIG. 7. In some embodiments, the first set of one or more reselection parameters also includes one or more reselection parameters assigned according to a suitable reselection method different than the method 300 of FIG. 6 and/or the method 310 of FIG. 7.

At block 324, the tracking area identifier associated with the neighbor cell (received at block 322) is compared to a tracking area identifier associated with the current cell. In an embodiment, a user device performing the method 320 knows the tracking area identifier associated with the current cell a priori (e.g., if a base station of the current cell transmitted the current cell tracking area identifier to the user device when the current cell was selected or reselected). In an embodiment, the comparison at block 324 includes determining whether the tracking area identifier associated with the neighbor cell is different than the tracking area identifier associated with the current cell. In an embodiment, other suitable identifiers other than tracking area identifiers are compared to determine whether the tracking area associated with the neighbor cell is different than the tracking area associated with the current cell.

At block 326, a second set of one or more reselection parameters associated with the neighbor cell is determined. In an embodiment, the parameters of the second set of one or more reselection parameters are parameters determined by a network interface (e.g., by a PHY processing unit of the network interface) of a user device performing the method 320 (e.g., PHY processing unit 130 of UE 125 in FIG. 2) by measuring signals received from a base station of the neighbor cell (e.g., from eNB 114-2 when UE 125 is currently served by eNB 114-1). In an embodiment, the parameters include one or more measured reselection parameters utilized in the prior art cell reselection method of FIG. 3-5B. For example, in various embodiments, the second set of one or more reselection parameters includes one or more of Snonservingcell,x, Sservingcell, Rn, and Rs. In an embodiment, the second set of one or more reselection parameters includes one or more measured suitable reselection parameters utilized by a suitable cell reselection method different than the prior art cell reselection method of FIG. 3-5B. In some embodiments, the determination at block 326 includes determining which reselection parameters to measure based on the comparison at block 324, and/or based on a different comparison (e.g., a comparison of frequency priorities). For example, in an embodiment, the determination at block 326 includes measuring a signal from the current cell only if the comparison at block 324 indicates that the tracking area associated with the neighbor cell is different than the tracking area associated with the current cell.

At block 330, it is determined whether to reselect the neighbor cell based on (i) whether the tracking area associated with the neighbor cell is different than the tracking area associated with the current cell (e.g., determined based on the comparison of the tracking area identifier associated with the neighbor cell to the tracking area identifier associated with the current cell at block 324), (ii) the first set of one or more reselection parameters received at block 322, (iii) the second set of one or more reselection parameters determined at block 326, and (iv) a set of one or more reselection criteria. In an embodiment, the reselection criteria determine how the outcome of the comparison at block 324, the reselection parameter(s) received at block 322, and the reselection parameter(s) determined at block 326 are utilized to make a decision whether to reselect the neighbor cell. For example, in an embodiment, the reselection criteria define which parameter(s) of the second set of reselection parameters should be greater than or less than which parameter(s) of the first set of reselection parameters, etc., in order for reselection to occur. In some embodiments, the reselection criteria include different sub-criteria. For example, in an embodiment, different sub-criteria are applied based on whether the comparison at block 324 indicates that the tracking areas of the current and neighbor cells are the same or different.

In some embodiments, the method 320 includes additional blocks not shown in FIG. 8. For example, in an embodiment, the method 320 includes entering an idle mode before receiving the first set of one or more reselection parameters at block 322. As another example, in an embodiment where determining whether to reselect the neighbor cell at block 330 includes determining to reselect the neighbor cell, the method 320 includes, after determining to reselect the neighbor cell, causing a tracking area update to be transmitted to a base station associated with the neighbor cell.

In some embodiments, the blocks of method 320 shown in FIG. 8 occur in a different order than shown. For example, in an embodiment, the comparison at block 324 occurs after the determination at block 326. As another example, in an embodiment, block 322 occurs at least in part simultaneously with block 324 and/or block 326.

FIGS. 9A-9B are flow diagrams of another example method 350 for performing cell reselection, according to an embodiment. Like the method 320 of FIG. 8, the method 350 is implemented by a user device. For example, in an embodiment, the method 350 is implemented by the user device 24 of FIG. 1. As another example, in an embodiment, the method 350 is implemented by the UE 125 (e.g., by the network interface 127 of UE 125) of FIG. 2.

Referring first to FIG. 9A, a first set of one or more reselection parameters is received at block 352. In an embodiment, the first set of one or more reselection parameters is received from a base station of a cell currently serving a user device performing the method 350. Moreover, in some embodiments, the reselection parameters are received via a control channel (e.g., in one or more SIBs) while the user device is in an idle mode. The first set of one or more reselection parameters includes a tracking area identifier (e.g., a tracking area code) associated with a neighbor cell, a priority of a signal frequency utilized by the neighbor cell, a set of one or more timer values, and a set of one or more thresholds. In some embodiments, the first set of reselection parameters also includes one or more additional parameters. In an embodiment, the priority, timer value(s), and threshold(s) are parameters used in the prior art cell reselection technique shown in FIGS. 3-5B. For example, in an embodiment, the priority is the priority used to determine which of method portions 140, 160, and 190 of FIGS. 3-5 is applied, the timer value(s) include the parameter TreselectionRAT, and the threshold(s) include the parameter Thresh_x,high. In some embodiments, the received one or more reselection parameters include one or more reselection parameters used in a suitable reselection method different than the reselection technique shown in FIGS. 3-5B.

At block 354, the tracking area identifier associated with the neighbor cell (received at block 352) is compared to a tracking area identifier associated with the current cell. In an embodiment, block 354 is similar to block 324 of the method 320 in FIG. 8.

At block 356, the priority of the signal frequency utilized by the neighbor cell (received at block 352) is compared to a priority of a signal frequency utilized by the current cell. In an embodiment, a user device performing the method 350 knows the priority of the signal frequency utilized by the current cell a priori (e.g., if a base station of the current cell transmitted the priority to the user device when the current cell was selected or reselected). In an embodiment, the comparison at block 356 includes determining whether the priority of the signal frequency utilized by the neighbor cell is different than the priority of the signal frequency utilized by the current cell.

At block 360, a timer value from the set of one or more timer values is selected based on the comparisons at block 354 and block 356. For example, in some embodiments where the received set includes multiple timer values, a timer value is selected based on a) whether the tracking area identifiers compared at block 354 are the same or different and/or b) whether the priorities compared at block 356 indicate that the priority of the signal frequency utilized by the neighbor cell is higher than, equal to, or lower than the signal frequency utilized by the current cell. In some of these embodiments, a different timer value of the set of timer values corresponds to each of the six possible combinations resulting from blocks 354 and 356 (e.g., different tracking area and higher priority, same tracking area and higher priority, different tracking area and equal priority, same tracking area and equal priority, etc.). In other of these embodiments, at least one timer value is selected for more than one combination (e.g., a first timer value is selected for all combinations including a different tracking area, and a second timer value is selected for all combinations including the same tracking area, in an embodiment). In embodiments where the set of one or more timer values only includes one timer value, block 360 is omitted from the method 350.

At block 362, a threshold from the set of one or more thresholds is selected based on the comparisons at block 354 and block 356. For example, in some embodiments where the received set includes multiple thresholds, a threshold is selected based on a) whether the tracking area identifiers compared at block 354 are the same or different and/or b) whether the priorities compared at block 356 indicate that the priority of the signal frequency utilized by the neighbor cell is higher than, equal to, or lower than the signal frequency utilized by the current cell. In some of these embodiments, a different threshold of the set of thresholds corresponds to each of the six possible combinations resulting from blocks 354 and 356 (e.g., different tracking area and higher priority, same tracking area and higher priority, different tracking area and equal priority, same tracking area and equal priority, etc.). In other of these embodiments, at least one threshold is selected for more than one combination (e.g., a first threshold is selected for all combinations including a higher priority, a second threshold is selected for all combinations including an equal priority, and a third threshold is selected for all combinations including a lower priority, in an embodiment). In embodiments where the set of one or more thresholds only includes one threshold, block 362 is omitted from the method 350.

Referring next to FIG. 9B, a second set of one or more reselection parameters associated with a neighbor cell is determined at block 364. The second set of one or more reselection parameters includes an indication of a received signal strength. In various embodiments, the indication of the received signal strength is a measured power level (e.g., in dBm), a quantity linearly related to a measured power level, or a different suitable quantity that provides an indication of received signal strength. In some embodiments, the indication of the received signal strength is a measured reselection parameter utilized in the prior art cell reselection method of FIG. 3-5B. For example, in various embodiments, the indication of the received signal strength is one of Snonservingcell, x, Sservingcell, Rn, and Rs. In some embodiments, the second set of one or more reselection parameters includes more than one of Snonservingcell,x, Sservingcell, Rn, and Rs. In some embodiments, the second set of one or more reselection parameters includes one or more measured reselection parameters used in a suitable reselection method different than the reselection technique shown in FIGS. 3-5B.

In an embodiment, the parameters of the second set of reselection parameters are determined by a network interface (e.g., by a PHY processing unit of the network interface) of a user device performing the method 350 (e.g., PHY processing unit 130 of UE 125 in FIG. 2). For example, in an embodiment, PHY processing unit 130 of UE 125 in FIG. 2 determines an indication of a strength of a signal received from a base station of the neighbor cell (e.g., from eNB 114-2 when UE 125 is currently served by eNB 114-1). As another example, in an embodiment, PHY processing unit 130 of UE 125 in FIG. 2 determines an indication of a strength of a signal received from a base station of the current cell (e.g., from eNB 114-1 when UE 125 is currently served by eNB 114-1).

At block 366, it is determined whether the indication of the received signal strength determined at block 364 is greater than the threshold selected at block 362 for a time at least equal to the timer value selected at block 360. In embodiments where only one threshold is received at block 352 and block 362 is omitted, it is instead determined at block 366 whether the indication of the received signal strength determined at block 364 is greater than the single threshold for a time at least equal to the timer value selected at block 360. Similarly, in embodiments where only one timer value is received at block 352 and block 360 is omitted, it is instead determined at block 366 whether the indication of the received signal strength determined at block 364 is greater than the threshold selected at block 362 for a time at least equal to the single timer value. In some embodiments, other, additional reselection criteria are also applied before, after, or as a part of block 366. For example, in some embodiments where more than one reselection parameter is determined at block 364, an additional block includes additional reselection criteria corresponding to the additional determined reselection parameter(s).

If it is determined at block 366 that the indication of the received signal strength is greater than the threshold for a time at least equal to the timer value, flow proceeds to block 370. At block 370, the neighbor cell under consideration is reselected. If it is determined that the indication of the received signal strength is not greater than the threshold for a time at least equal to the timer value, flow proceeds back to block 364 (i.e., additional measured reselection parameters are determined, etc.). In other embodiments, flow proceeds back to an earlier block (e.g., to block 352, in an embodiment).

In some embodiments, the method 350 includes other additional blocks not shown in FIGS. 9A and 9B. For example, in an embodiment, an idle mode is entered before block 352. As another example, in an embodiment, the method 350 includes causing a tracking area update to be transmitted (e.g., to a base station of the reselected cell) after block 370. As yet another example, in an embodiment, the method 350 includes receiving (e.g., from a base station of the current cell) a set of one or more reselection criteria before block 366, or before both of blocks 364 and 366.

In some embodiments, the blocks of method 350 shown in FIGS. 9A and 9B occur in a different order than shown. For example, in an embodiment, the comparisons at blocks 354 and 356 are reversed in order or occur simultaneously. As another example, in an embodiment, block 364 occurs before or simultaneously with block 352, block 354, block 356, block 360, and/or block 362.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While various aspects of the present invention have been described with reference to specific examples, which are intended to be illustrative only and not to be limiting of the invention, changes, additions and/or deletions may be made to the disclosed embodiments without departing from the scope of the invention.

What is claimed is:

1. A method for performing cell reselection in a user device served by a first cell, the method comprising:
    receiving a first set of one or more reselection parameters, wherein the first set of one or more reselection parameters includes (i) a tracking area identifier associated with a second cell and (ii) a priority of a signal frequency utilized by the second cell, wherein the second cell neighbors the first cell;
    comparing the tracking area identifier associated with the second cell to a tracking area identifier associated with the first cell;
    comparing the priority of the signal frequency utilized by the neighbor cell to a priority of a signal frequency utilized by the current cell;
    determining a second set of one or more reselection parameters associated with the second cell; and
    determining whether to reselect the second cell based on (i) a comparison of the tracking area identifier associated with the second cell to the tracking area identifier associated with the first cell, (ii) a comparison of the priority of the signal frequency utilized by the second cell to the priority of the signal frequency utilized by the first cell, (iii) the first set of one or more reselection parameters, (iv) the second set of one or more reselection parameters, and (v) a set of one or more reselection criteria, including
        selecting a threshold based on (i) the comparison of the tracking area identifier associated with the second cell to the tracking area identifier associated with the first cell, and (ii) a comparison of the priority of the signal frequency utilized by the second cell to the priority of the signal frequency utilized by the first cell, and
        comparing a reselection parameter of the second set to the selected threshold.

2. A method according to claim 1, wherein
the first set of one or more reselection parameters further includes a set of one or more timer values, and
the second set of one or more reselection parameters includes an indication of a received signal strength, and
the method further comprises:
    based on the comparison of the tracking area identifier associated with the second cell to the tracking area identifier associated with the first cell and based on the comparison of the priority of the signal frequency utilized by the second cell to the priority of the signal frequency utilized by the first cell selecting a timer value from the set of one or more timer values.

3. A method according to claim 2, wherein determining whether to reselect the second cell includes determining whether the indication of the received signal strength exceeds the selected threshold for a duration of the selected timer value.

4. A method according to claim 1, further comprising:
    before receiving the first set of one or more reselection parameters, entering an idle mode.

5. A method according to claim 1, wherein determining whether to reselect the second cell includes determining to reselect the second cell, and the method further comprising:
    after determining to reselect the second cell, causing a tracking area update to be transmitted to a base station associated with the second cell.

6. A communication device, comprising:
a network interface configured to
    while the communication device is served by a first cell, receive a first set of one or more reselection parameters, wherein the first set of one or more reselection parameters includes (i) a tracking area identifier associated with a second cell and (ii) a priority of a signal frequency utilized by the second cell, wherein the second cell neighbors the first cell, compare the tracking area identifier associated with the second cell to a tracking area identifier associated with the first cell, compare the priority of the signal frequency utilized by the neighbor cell to a priority of a signal frequency utilized by the current cell, determine a second set of one or more reselection parameters associated with the second cell, and determine whether to reselect the second cell based on (i) a comparison of the tracking area identifier associated with the second cell to the tracking area identifier associated with the first cell, (ii) a comparison of the priority of the signal frequency utilized by the second cell to the priority of the signal frequency utilized by the first cell, (iii) the first set of one or more reselection parameters, (iv) the second set of one or more reselection parameters, and (v) a set of one or more reselection criteria, including selecting a threshold based on (i) the comparison of the tracking area identifier associated with the second cell to the tracking area identifier associated with the first cell, and (ii) a comparison of the priority of the signal frequency utilized by the second cell to the priority of the signal frequency utilized by the first cell, and comparing a reselection parameter of the second set to the selected threshold.

\* \* \* \* \*